United States Patent Office 2,927,103
Patented Mar. 1, 1960

2,927,103

PROCESS FOR POLYMERIZING OLEFINS

Abraham Schneider, Overbrook Hills, and James L. Jezl, Swarthmore, Pa., assignors to Sun Oil Company, Philadelphia, Pa., a corporation of New Jersey No Drawing. Application February 4, 1958
Serial No. 713,112

12 Claims. (Cl. 260—88.2)

This invention relates to a process for the preparation of relatively high molecular weight polymers of alpha-olefins, and more particularly relates to a process for the preparation of solid, crystalline polymers of normally gaseous olefins in which the separation of catalyst from the polymer product is readily accomplished and in which a portion of the catalyst is recovered and can be reused.

Normally gaseous alpha-olefins such as propylene have heretofore been polymerized to high molecular weight solid polymers. A catalyst which is especially effective for this polymerization is the combination of a lower halide of titanium, such as titanium trichloride, and an aluminum trialkyl, such as aluminum triisobutyl. This catalyst can be prepared by admixing, for example, titanium tetrachloride and aluminum triisobutyl in an inert solvent such as isooctane. On admixing the two components, a finely divided solid phase is formed as a dispersion in the inert solvent. This dispersion acts as a catalyst for polymerizing olefins to solid polymers. If desired, the catalytic system can be prepared by dispersing a preformed lower halide such as titanium trichloride, together with an activator such as aluminum triisobutyl, in an inert, liquid reaction medium such as isooctane. Generally, an excess of the aluminum alkyl is used since, as has been found, the rate of polymerization is increased thereby. For example, from 2 to 15 moles of aluminum alkyl per mole of titanium trichloride is commonly used. In performing the polymerization step, the olefin is contacted with the solid catalyst, such as by passing the olefin into a suspension of the finely divided solid in the inert, liquid reaction medium maintained under polymerizing conditions. Anhydrous and oxygen-free conditions are used throughout the process, since the catalyst is deactivated by contact with water or oxygen.

After the polymerization reaction is complete, or has proceeded to a desired extent, the polymer products must be separated from the catalyst. As heretofore performed, a catalyst deactivating material such as water or an alcohol is added to the reaction mixture after the polymerization reaction is complete or has proceeded to the desired extent. In order to remove the inorganic catalyst, or the inorganic residues from catalyst deactivation, the water or alcohol or an aqueous or alcoholic solution of a strong inorganic acid such as nitric acid, is contacted with the polymer while comminuting the polymer to expose the catalyst particles. The solid polymer is then separated from the liquid, and is washed and dried. However, catalyst removal by this means is unsatisfactory in that removal of even a major proportion of the catalyst is difficult, and both of the catalytic components, i.e., the titanium chloride and the aluminum alkyl, are destroyed, which makes the process prohibitively expensive.

An object of the present invention is to provide a process for the polymerization of normally gaseous olefins in which a portion of the catalytic components are recovered. A further object is to provide a process for the preparation of polyolefins in which a portion of the catalytic materials are recovered, and the remaining portion is easily removed from the polymer product. Other objects and their achievement in accordance with the process of the invention will be apparent hereinafter.

It has now been found that, in polymerizing an alpha-olefin by contacting the olefin with a dispersion of a solid catalytic material and an aluminum trialkyl activator therefor in an inert, liquid reaction medium, by subsequently heating the liquid portion of the reaction mixture while in contact with propylene or isobutylene to an elevated temperature, aluminum tripropyl or triisobutyl is thereafter readily recoverable from such liquid portion. It has been further found that by simultaneously or separately heating the solid portion of the reaction mixture to a like temperature in the presence of isobutylene, the titanium-containing portion of the catalytic components is thereafter readily removed from the polymer.

Olefins which can be polymerized in the present process are the alpha-olefins, i.e., olefins which have a terminal olefinic bond and which are gaseous under atmospheric conditions of temperature and pressure. Ethylene, propylene, butene-1 and mixtures thereof are preferred olefins to employ. For convenience, the present invention is described hereinafter largely in terms of using propylene as the alpha-olefin polymerized. Also for convenience, the process is described in terms of using titanium trichloride and aluminum triisobutyl as the catalytic components although the invention is not so limited as hereinafter described.

In an embodiment of the process of the invention, propylene is contacted with a dispersion of titanium trichloride particles in isooctane, the dispersion containing aluminum triisobutyl in a mole ratio thereof to titanium trichloride of 5:1. After the polymerization reaction is complete, or has proceeded to a desired extent, excess propylene, if any, is vented from the reactor and the liquids of the polymerization system are separated, such as by draining, from the solids including the polymer product. Aluminum-containing materials are largely separated with the liquids but, as has been found, the aluminum triisobutyl is converted during the polymerization reaction largely to higher molecular weight aluminum compounds which cannot be separated by distillation. In accordance with the invention, the separated liquid, which consists essentially of relatively high boiling aluminum alkyls, unchanged aluminum triisobutyl, isooctane, and in some instances a small amount of low molecular weight polymers of propylene, such as the trimer and tetramer thereof, is contacted with isobutylene or propylene for a time up to 5 hours at a temperature of at least 100° C., say from 100° C. to 250° C. Mild agitation is advantageously employed during the contacting. The pressure during the contacting can be atmospheric, but the time required is decreased by using an elevated pressure, say from 30 to 100 p.s.i.g. (pounds per square inch gauge). Thereafter, aluminum triisobutyl is recovered from the mixture by distillation. The recovered aluminum trialkyl can be reused in the polymerization process. The isooctane is also recovered in the distillation process and can be reused. It is believed that the relatively long hydrocarbon chains attached to the aluminum which are formed in the polymerization reaction undergo an exchange with the isobutylene on heating to the relatively high temperature to form aluminum triisobutyl, which can be separated by distillation.

In carrying out the distillation to separate aluminum triisobutyl, subatmospheric pressure can be used in order to decrease the temperature required, and hence lessen decomposition of the aluminum alkyl which might otherwise be observed. It is also advantageous to introduce a relatively high boiling, inert liquid, such as a high boiling saturated hydrocarbon or a mixture of hydrocarbons, into the mixture prior to distillation and such high boiling, inert material can be introduced prior to contacting the separated liquids with isobutylene at the elevated temperature. It is also advantageous to pass the isobutylene through the materials being distilled, which aids in completing the formation of aluminum triisobutyl and in flushing it from the distillation vessel. The higher boiling added material and the hydrocarbon material separated from the aluminum largely remain as residue, and can be separated if desired by any convenient means and reused.

The solids separated from the liquids of the polymerization reaction mixture can be admixed with a catalyst deactivant as heretofore described, but such deactivation and catalyst removal are unsatisfactory. In accordance with the present invention, the solids as a slurry in an inert liquid, which can be the same as, or different from, the reaction medium, are contacted with isobutylene at a temperature at least 100° C. preferably with agitation. The same conditions of time, temperature and pressure as used with the liquid portion of the reaction mixture are advantageously employed. After cooling to precipitate dissolved polymer, if necessary, a catalyst deactivant and solvent is added with agitation and the liquids drained from the solid polymer. It is believed that in the heating process the organo-metallic bonds connecting the polymer and metal catalyst are broken with isobutylene replacing the polymer, and that the relatively low molecular weight isobutylene-catalyst is readily deactivated and the inorganic portion dissolved with the catalyst deactivant and/or solvent. In this embodiment propylene cannot be substituted for isobutylene, and in general, whenever solids from the polymerization reaction are present, isobutylene must be used.

In another embodiment of the present process, after the polymerization reaction is complete or has proceeded to the desired extent, excess propylene is vented from the reactor. Isobutylene is introduced into the reactor and the reaction mixture is heated to a temperature of at least 100° C. in contact with the added isobutylene. Again the same conditions of time, temperature and pressure as used with the liquid portion of the reaction mixture are advantageously employed. After removing any excess isobutylene, the mixture is cooled to precipitate polymer which may have dissolved at the elevated temperature, if any, and the liquids are separated, such as by draining, from the solids. The separated liquids are distilled as above described to separate aluminum triisobutyl which is recycled in the process. The remaining solids are treated with a catalyst deactivant and solvent such as methanol or an aqueous or alcoholic solution of an inorganic acid such as nitric acid or hydrochloric acid, preferably with agitation means, and the solid polymer then drained, washed and dried.

The process of the invention produces polymers having molecular weights of above about 5,000 and usually within the range of from about 50,000 to 300,000. A proportion of the solid product obtained with the mentioned catalyst is crystalline, i.e., exhibits a crystalline structure by X-ray analysis, while the remaining solid product is amorphous. The polymer products of the invention are especially useful in the form of thin sheets for packaging materials, as containers or conduits for fluids, and the like. Such articles can be prepared by molding, extrusion or other fabrication processes.

As above stated, titanium trichloride gives good results in the process as the solid polymerization catalyst. However, other halides of metals from groups IV, V or VI of the periodic table can be used with good results. Preferably a chloride, fluoride or bromide of titanium, zirconium, hafnium, vanadium, niobium, chromium, molybdenum or tungsten is used. The metal halide must be a metal sub-halide, i.e., the metal of the halide must be in a valence state other than its highest valence state. The preparation of such halides can be by any convenient means. The reduction of a metal compound such as titanium tetrachloride to titanium trichloride, for example, can be accomplished by any convenient means and the product used in the process of the invention. Thus, a mixture of titanium tetrachloride and hydrogen in vapor phase can be heated, or other reducing means such as by contacting the metal compound with a dispersion of an alkali metal in an inert solvent can be used.

Aluminum triisobutyl is the preferred aluminum alkyl to use, since this alkyl is recovered, in the present process, by contacting all or an appropriate portion of the reaction mixture with isobutylene, and it does not appear that, in this recovery, other olefins can be substituted for isobutylene except that proylene can be used for contacting liquids from the polymerization reaction mixture. However, other aluminum alkyls, such as aluminum triethyl and aluminum triisopropyl, can be used in the initial polymerization, and such aluminum alkyls remaining unchanged in the reaction mixture, such as where used in substantial excess, are recovered unchanged together with the aluminum alkyl formed from the added olefin and higher molecular weight aluminum alkyls formed during the polymerization reaction. It is also possible to recover mixed aluminum alkyls, such as aluminum diethylisobutyl, in the process.

In performing the polymerization step in the present process, temperatures of from about 20° C. to 160° C. are suitable. Atmospheric pressure can be used, but somewhat elevated pressures, say from about 30 to 500 p.s.i.g., give faster polymerization rates. The time required for the polymerization will vary according to the conditions, catalyst, and alpha-olefin employed, it being apparent that sufficient time for completion of the reaction, or to obtain a desired degree of polymerization, should be used. It is advantageous in the polymerization to use an excess of aluminum alkyl, i.e., to use a quantity of aluminum alkyl such that the mole ratio thereof to the metal subhalide is greater than one, say from 2 to 12 or more, and the process of the present invention is especially applicable to recovering such excess of aluminum alkyl.

The inert, liquid reaction medium used in the process is preferably a saturated aliphatic or cycloaliphatic hydrocarbon. The hexanes, heptanes, octanes, decanes, cyclohexanes, and homologues and mixtures thereof give good results.

The following specific embodiments illustrate the process of the invention in which "parts" refers to parts by weight:

Into a reactor were introduced about 3,200 parts of a mixture of saturated hydrocarbons consisting principally of octanes, about 1 part of $TiCl_3$ particles, and a quantity of aluminum triethyl sufficient to give a mole ratio thereof to the $TiCl_3$ of 12.2. Propylene was introduced into the reactor to give a concentration thereof of 55 mole percent. The temperature was maintained in the range of from 70° C. to 72° C. and the concentration of propylene at about 55 mole percent by periodically introducing propylene until the reaction was complete as indicated by the lack of propylene consumption. Constant mechanical agitation and substantially anhydrous and oxygen-free conditions were maintained during the polymerization. Thereafter, the liquid portion of the reaction mixture was separated from the solids by filtration. The separated liquid was divided into three portions and treated as follows:

(1) After introducing 23 volume percent dodecane, the liquid was heated in a still to 200° C. Nitrogen was then continuously introduced into the liquid and used to flush the still. After removal of volatile material, the residue contained 3.9 weight percent of aluminum.

(2) The above procedure was repeated except that propylene was substituted for nitrogen in contacting the liquid and flushing the still. The residue contained 2.2 weight percent aluminum.

(3) The procedure was again repeated except that propylene was continuously introduced into the liquid from the time heating was commenced. The residue contained 0.5 weight percent aluminum. The weight percent aluminum alkyl (calculated as aluminum) recovered in the distillate was 79 weight percent. The recovered aluminum alkyl could be used as a catalytic component for the polymerization of olefins.

The separated solids are slurried in isooctane and the slurry agitated at 120° C. in contact with isobutylene. After draining the liquids, the solids are then contacted with methanol and drained. Substantially all of the inorganic materials are separated as a solution in methanol, the quantity remaining being less than about one-half the amount observed when the same procedure is followed except for omitting the contacting with isobutylene.

The invention claimed is:

1. Process for the polymerization of normally gaseous alpha-olefins which comprises contacting, under polymerizing conditions, a normally gaseous alpha-olefin with a dispersion of a subhalide of a metal selected from the group consisting of the metals of groups IV, V, and VI of the periodic table and an aluminum alkyl selected from the group consisting of aluminum triethyl, aluminum triisopropyl, and aluminum triisobutyl in an inert, liquid reaction medium whereby the alpha-olefin is converted to solid polymers, separating solid polymers from the liquid portion of the reaction mixture, and contacting the liquid portion of the reaction mixture with an olefin selected from the group consisting of propylene and isobutylene at a temperature of at least 100° C., and recovering an aluminum alkyl therefrom.

2. Process according to claim 1 wherein said alpha-olefin is ethylene.

3. Process according to claim 1 wherein said alpha-olefin is propylene.

4. Process according to claim 1 wherein said alpha-olefin is butene-1.

5. Process according to claim 1 wherein said alpha-olefin is a mixture of ethylene and propylene.

6. Process for the polymerization of normally gaseous alpha-olefins which comprises contacting, under polymerizing conditions, a normally gaseous alpha-olefin with a dispersion of a subhalide of a metal selected from the group consisting of the metals of groups IV, V, and VI of the periodic table and an aluminum alkyl selected from the group consisting of aluminum triethyl, aluminum triisopropyl, and aluminum triisobutyl in an inert, liquid reaction medium whereby the alpha-olefin is converted to solid polymers separating the solid polymers from the balance of the reaction mixture, slurrying the solid polymers in an inert liquid hydrocarbon, contacting the slurry with isobutylene at a temperature of at least 100° C., separating solid polymer from the treated slurry, and thereafter contacting the separated polymer with a catalyst solvent.

7. Process according to claim 6 wherein said alpha-olefin is ethylene.

8. Process according to claim 6 wherein said alpha-olefin is propylene.

9. Process according to claim 6 wherein said alpha-olefin is butene-1.

10. Process according to claim 6 wherein said alpha-olefin is a mixture of ethylene and propylene.

11. Process for the polymerization of normally gaseous alpha-olefins which comprises contacting, under polymerizing conditions, a normally gaseous alpha-olefin with a dispersion of a subhalide of a metal selected from the group consisting of the metals of groups IV, V and VI of the periodic table and an aluminum alkyl selected from the group consisting of aluminum triethyl, aluminum triisobutyl, and aluminum triisopropyl in an inert, liquid reaction medium whereby the alpha-olefin is converted to solid polymers, contacting the reaction mixture with isobutylene at a temperature of at least 100° C., separating the liquid portion of the reaction mixture from solids therein, distilling separated liquid portion thereby to separate aluminum triisobutyl therefrom, and contacting the separated solids with a catalyst solvent.

12. Process for the preparation of polypropylene which comprises contacting, under polymerizing conditions, propylene with a dispersion of titanium trichloride in an inert, liquid reaction medium containing from about 2 to 15 moles of aluminum triisobutyl per mole of titanium trichloride whereby said propylene is polymerized to solid polymers, separating the liquid portion of the reaction mixture, contacting the separated liquid portion with isobutylene at a temperature of above about 100° C., and recovering aluminum triisobutyl from the so-treated separated liquid portion.

References Cited in the file of this patent

UNITED STATES PATENTS 2,825,721    Hogan _____ Mar. 4, 1958

FOREIGN PATENTS 537,782    Belgium _____ Dec. 6, 1955